June 26, 1973  W. V. WILLIAMS  3,741,836
METHOD OF SPLICING SYNTHETIC THERMOPLASTIC CARPET YARN ENDS
Original Filed Nov. 6, 1968  5 Sheets-Sheet 1
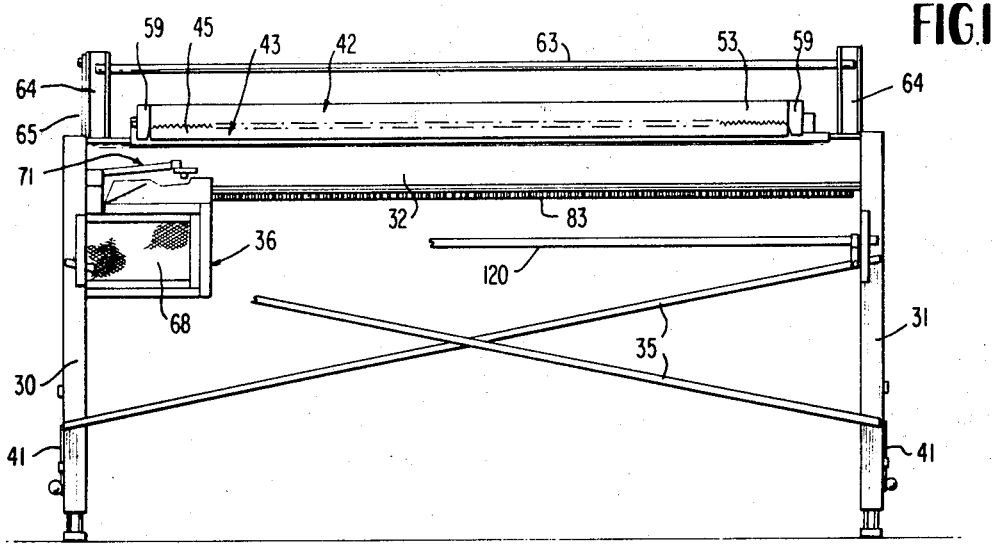
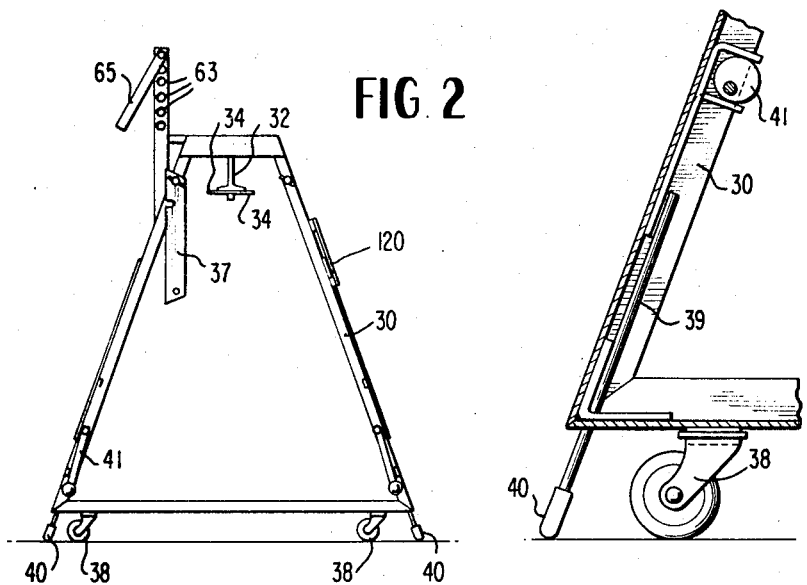
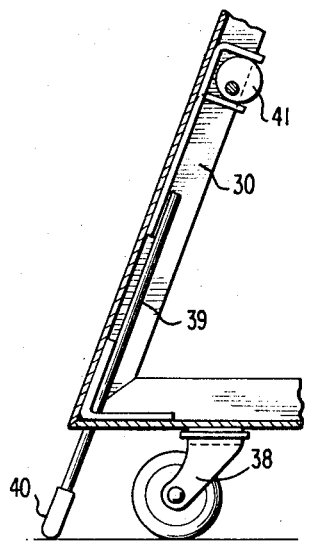
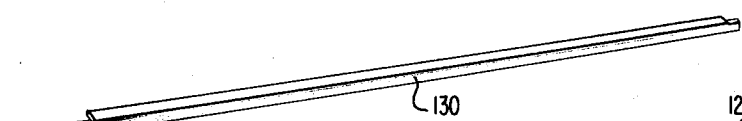
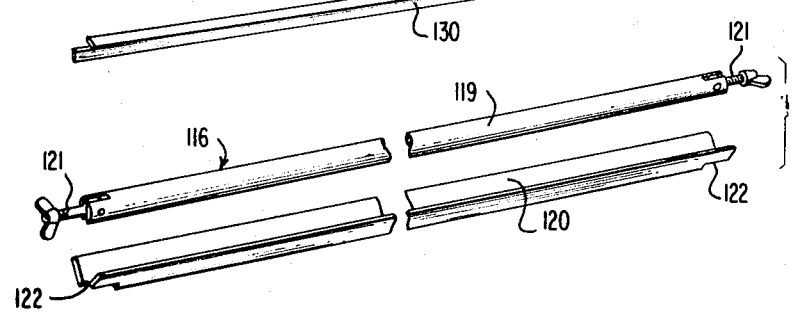

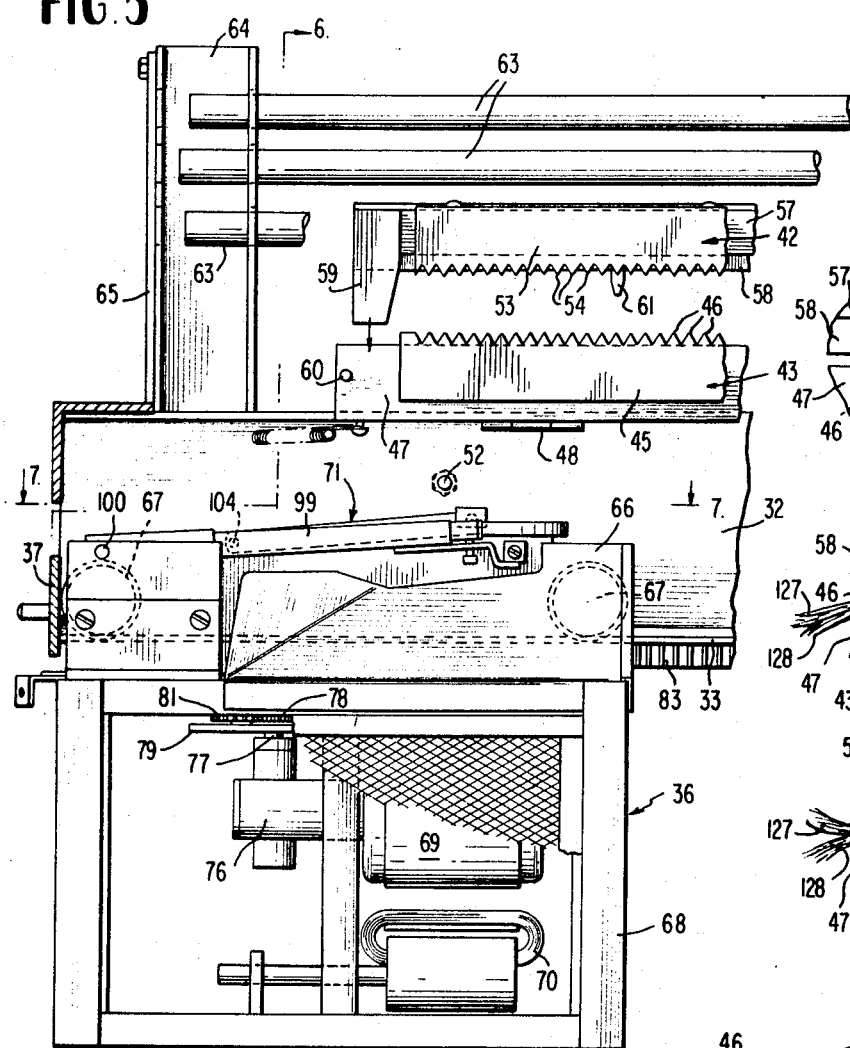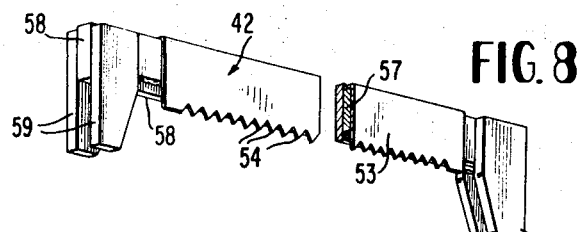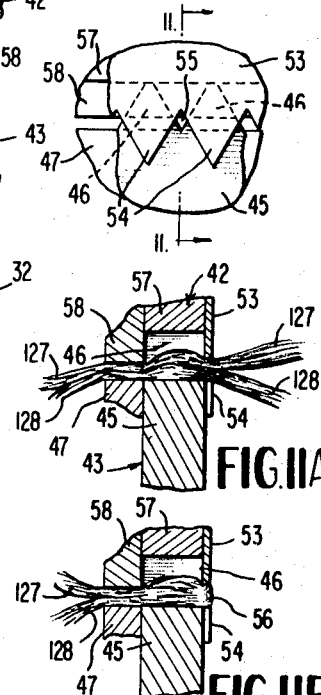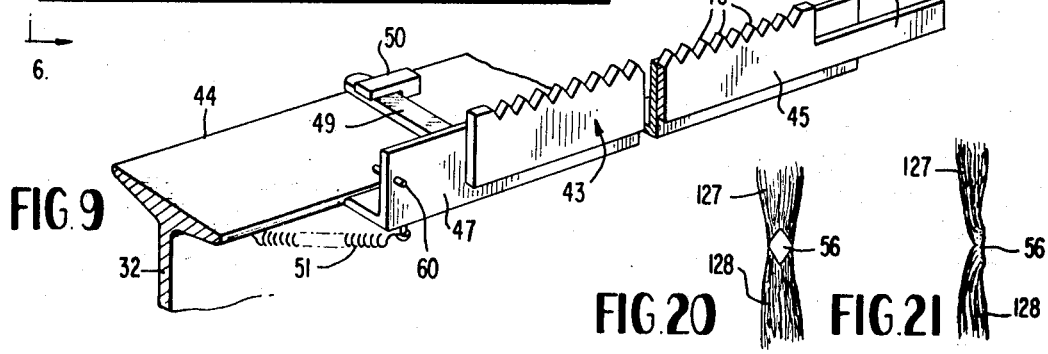

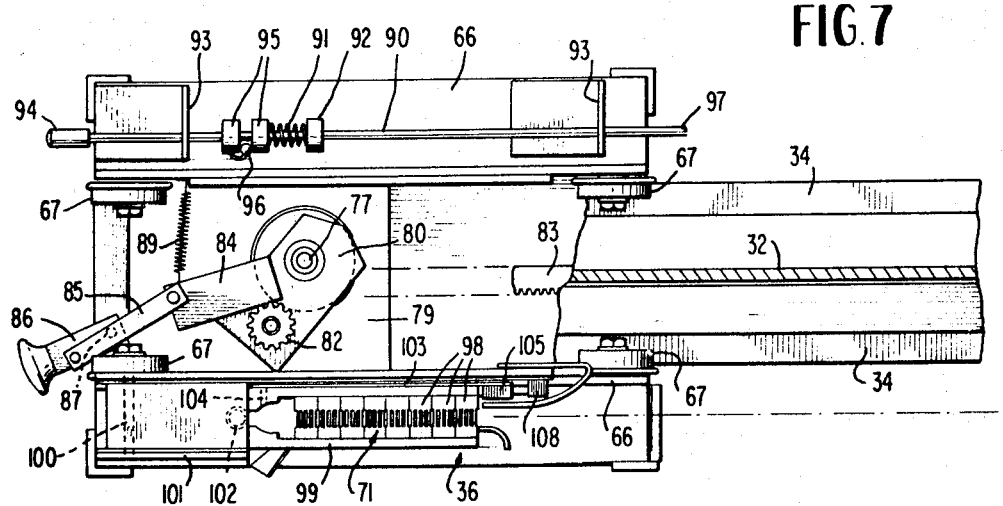
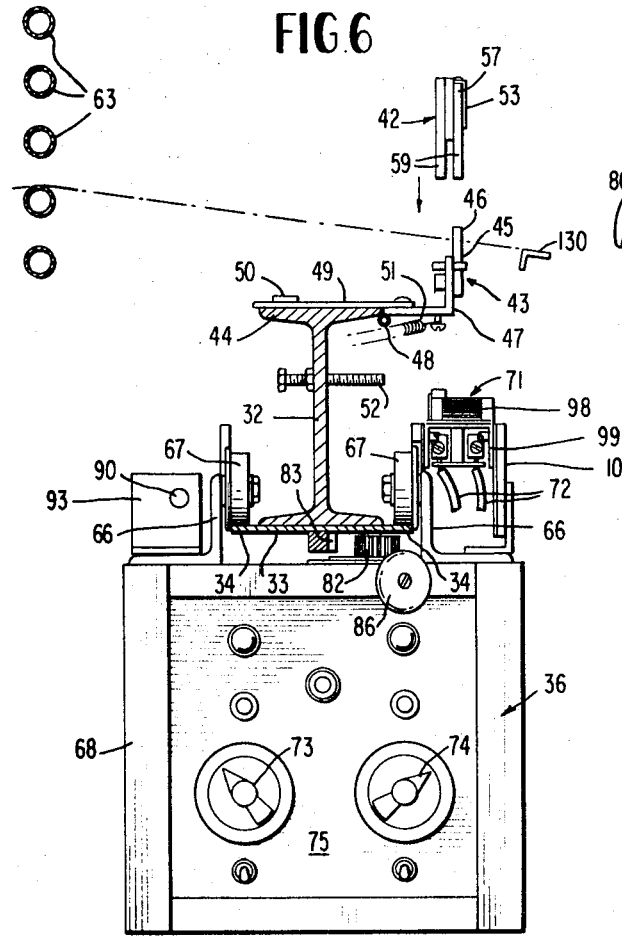
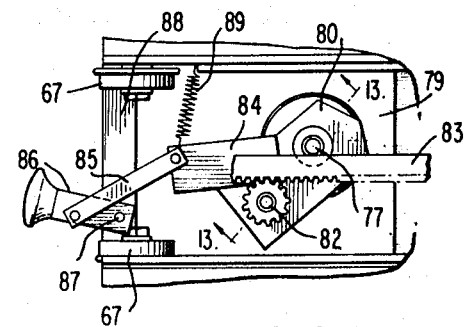
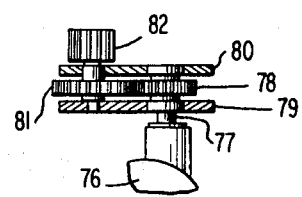

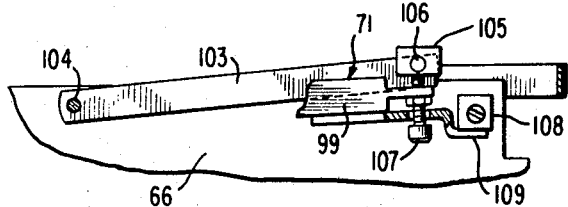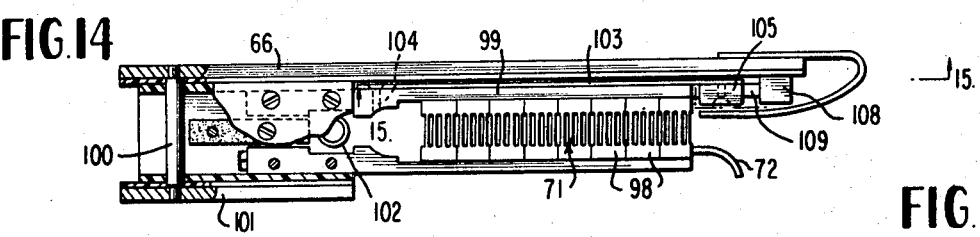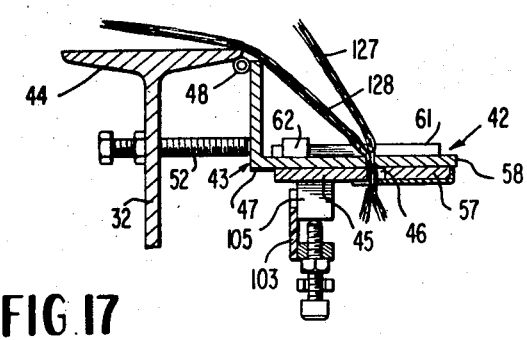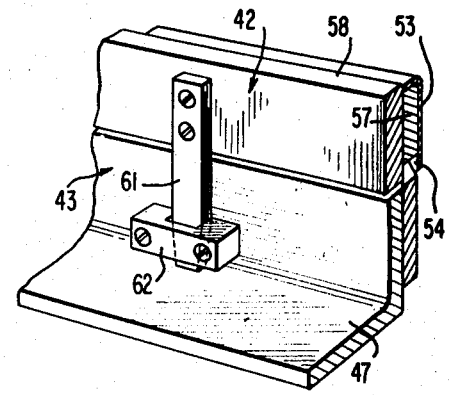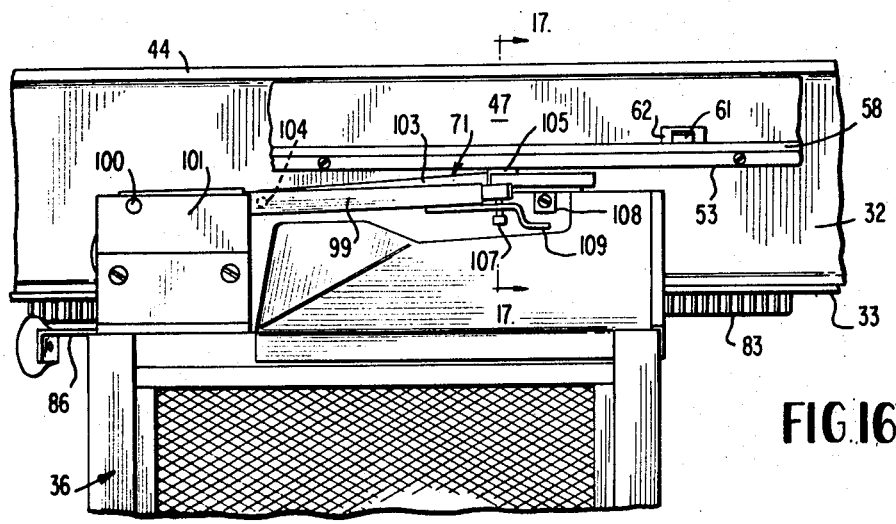

United States Patent Office 3,741,836
Patented June 26, 1973

3,741,836
METHOD OF SPLICING SYNTHETIC THERMOPLASTIC CARPET YARN ENDS
Willie V. Williams, 701 S. Green St.,
Dalton, Ga. 30720
Original application Nov. 6, 1968, Ser. No. 773,773, now Patent No. 3,616,054. Divided and this application July 19, 1971, Ser. No. 164,004
Int. Cl. B65h 69/08; D04h 3/14
U.S. Cl. 156—158                    4 Claims

ABSTRACT OF THE DISCLOSURE

Yarn ends from substantially spent plural beams of carpet yarns are prepared for splicing with similar yarn ends of new full beams by a series of orderly preparation steps. Following this, each set of trailing yarn ends from a previous single exhausted beam is spliced quickly by the operation of the invention splicing apparatus with the yarn ends of a single new beam, and the identical splicing operation is repeated for a required number of new beams utilized in producing carpet of a given width.

---

This application is a division of application Ser. No. 773,773, filed Nov. 6, 1968, now Pat. No. 3,616,054, granted Oct. 26, 1971.

BACKGROUND OF THE INVENTION

In the production of tufted carpet, up to fifteen feet in width, utilizing thermoplastic synthetic carpet yarns, an extremely difficult problem exists when the many hundreds of individual yarn ends from spent beams must be spliced with the corresponding yarn ends on new full beams. With regard to the thermoplastic yarns, the patent to Lower, Pat. No. 2,514,184 discloses that it is conventional in the textile industry to utilize all types of synthetic thermoplastic monofilaments in splicing operations. Up to thirty-two beams are employed simultaneously to feed the needles of a tufting machine producing wide tufted carpet. Conventionally, the splicing of yarn ends is done by hand utilizing latex adhesive or the like and is extremely tedious and time-consuming and very expensive. Knots cannot be tied to connect the yarn ends because knots will not pass through the needle eyes of the tufting machine. Care must be taken in the hand splicing of yarn ends with adhesive not to produce any enlargements on the yarn which might block passage through the needles.

Another common problem caused by splicing is the inevitable creation of splice marks in the carpet. In a wide carpet, unless these splice marks are confined within the narrowest possible zone, there can obviously result a wastage of carpet. The invention method renders it much easier to confine the splicing operation to a very narrow band of carpet, therefore reducing waste to the absolute minimum.

Even more importantly, the preliminary steps in the invention method preparng the yarn ends for splicing renders it feasible to utilize the quick acting splicing apparatus of the invention in a highly efficient manner, and this would not be possible without first preconditioning the yarn ends in accordance with the method.

The splicing apparatus eliminates entirely the tedious hand work commonly employed and allows a multitude of ends to be spliced during one quick pass of the heating element along and adjacent to a clamping means which holds the yarn ends of a particular beam.

Another feature of importance resides in the ability of the clamping and splicing means to produce a splice which actually narrows the cross section of the yarn at the point of splicing, rather than thickening the yarn, and thus actually facilitating its passage through the needle. Furthermore, the yarn splices are almost perfectly uniform for all yarn ends and not subject to the inherent variation caused by hand splicing and this constitutes a very important feature.

The invention apparatus is simplified, economical and sturdy and does not require a high degree of skill on the part of the user. Great economies can be achieved through the invention as will be readily apparent to anyone skilled in the art as the detailed description is followed.

BRIEF DESCRIPTION OF THE DRAWINGS

FIG. 1 is a front elevational view, with parts omitted, of a yarn splicing apparatus embodied in the invention.

FIG. 2 is an end elevation of the apparatus with the splicing head removed and parts omitted.

FIG. 3 is a perspective view of a taping bar employed with the apparatus.

FIG. 4 is an exploded perspective view of a clamping bar assembly.

FIG. 5 is an enlarged fragmentary front elevation of the apparatus showing the splicing head and associated elements in a preliminary position.

FIG. 6 is a transverse vertical section taken on line 6—6 of FIG. 5.

FIG. 7 is a horizontal section taken substantially on line 7—7 of FIG. 5, with parts broken away.

FIG. 8 is a perspective view of an upper clamping and positioning bar for yarn ends, partly broken away.

FIG. 9 is a fragmentary perspective view of a coacting lower clamping and positioning bar.

FIG. 10 is an enlarged fragmentary front elevation showing the overlapping relationship of teeth on the upper and lower clamping bars.

FIG. 11A is an enlarged fragmentary vertical section taken on line 11—11 of FIG. 10 and showing clamped yarn ends prior to splicing or welding.

FIG. 11B is a similar view taken on line 11—11 of FIG. 10 and showing the yarn ends after splicing or welding.

FIG. 12 is a fragmentary plan view of an engaging mechanism for drive gearing on the splicing head showing the drive gearing actively engaged.

FIG. 13 is a fragmentary vertical section taken on line 13—13 of FIG. 12.

FIG. 14 is an enlarged fragmentary plan view of a heating element assembly embodied with the splicing head.

FIG. 15 is a fragmentary vertical section taken on line 15—15 of FIG. 14.

FIG. 16 is a fragmentary front elevational view of the apparatus similar to FIG. 5 showing the yarn clamping and positioning bars in a down or active position relative to the heating element assembly.

FIG. 17 is an enlarged fragmentary vertical section taken on line 17—17 of FIG. 16.

FIG. 18 is an enlarged fragmentary rear perspective view of the upper and lower yarn clamping and positioning bars in assembled relationship.

FIG. 19 is an enlarged fragmentary vertical section taken through the supporting frame of the apparatus showing a floor-engaging brake or stabilizer.

FIG. 20 is a greatly enlarged fragmentary front elevational view of a single splice.

FIG. 21 is a side elevation of the splice.

DESCRIPTION OF THE PREFERRED EMBODIMENT

Figure 22:
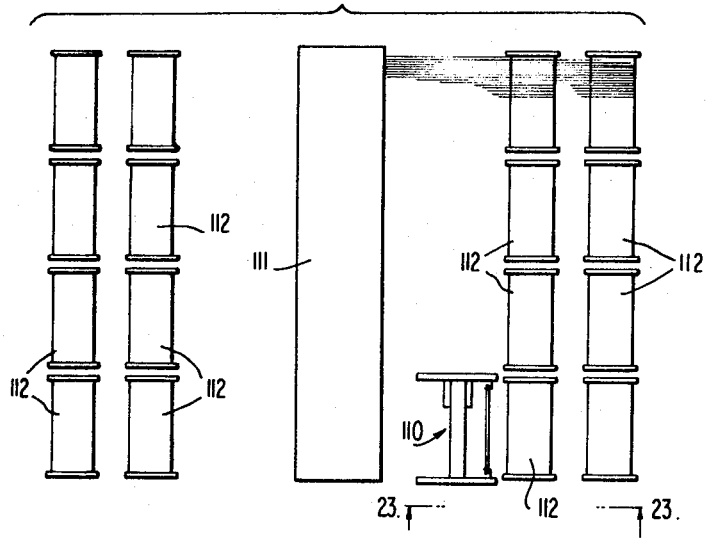
FIG. 22 is a diagrammatic plan view of a carpet tufting machine, plural beams of yarn supplying the tufting machine and the invention splicing apparatus in relation to a single beam.
Figure 23:
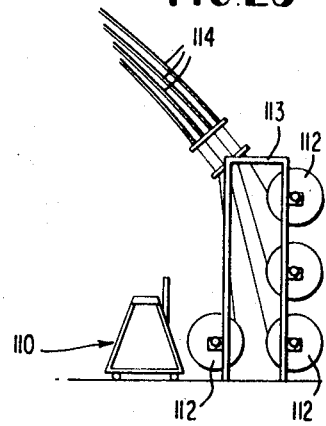
FIG. 23 is a fragmentary end elevational view of the invention apparatus and a bank of beams taken on line 23—23 of FIG. 22.

With reference to the drawings in which like numerals designate like parts, it is believed that the invention can be most readily understood by first describing in detail the splicing or welding apparatus and then considering the preparation steps of the method required for a proper use of the apparatus. Accordingly, reference is made first to FIGS. 1 through 21 in which the splicing apparatus is shown in considerable detail.

In these figures, the yarn splicing apparatus comprises a supporting frame including generally triangular frame ends 30 and 31 having their tops rigidly interconnected by a horizontal I-beam 32, having a horizontal plate 33 fixedly secured to its bottom and projecting equidistantly on opposite sides thereof to form track ledges 34, FIG. 7. The frame ends 31 may be further braced below the beam 32 as at 35, FIG. 1, for rigidity.

A yarn splicing or welding head 36, or unit, is adapted to travel back and forth horizontally on the track ledges 34 and is self-propelled as will be fully described and forms a very important component of the apparatus. The entire head or unit 36 is removable at one end of the apparatus adjacent the frame end 30 by simply unfastening one end of a swingable stop bar 37 on the frame end 30 to allow passage of the head 36 from its supporting track as shown in FIG. 2.

The entire apparatus is mounted preferably on corner caster wheels 38 so that it can be quickly shifted from one beam to the next, and brake or stabilizing devices are provided preferably at the corners of the main frame to prevent movement of the apparatus once it is in position for splicing the yarn ends of a particular beam. One such device is shown in FIG. 19 including an axially shiftable rod 39 having a friction foot 40 which engages the floor to secure the apparatus against movement and is raised and lowered by a manual eccentric mechanism 41 on the adjacent frame end. Different forms of braking or holding means may be employed upon the apparatus.

The splicing apparatus further comprises upper and lower yarn clamping and positioning bars or jaws 42 and 43 which, when assembled in active yarn gripping relationship, are supported hingedly on the top flange 44 of I-beam 32. These components together form another very important part of the apparatus and their purpose in the invention will be completely described. The upper clamping bar 42 constitutes a separate unit, FIG. 8, which is placed over the lower clamping bar 43 to clamp and position accurately a multitude of separate yarn ends taken from a single beam, said ends requiring splicing to the trailing ends of an exhausted or spent beam, the trailing ends from the spent beam having already been incorporated into the tufted carpet.

The lower clamping and positioning bar 43 comprises a body portion 45 of considerable thickness having tapered teeth 46 formed along its upper longitudinal edge in equidistantly spaced relation and throughout substantially its length. The body portion 45 is mounted fixedly on a sturdy angle bar 47 hinged at 48 to the upper flange 44 of I-beam 32. As shown in FIGS. 5, 10, 11A and 11B, the upper edge of angle bar 47 is flush with the roots of teeth 46 so that the yarn ends 127 and 128 will be securely clamped not only by the coacting teeth of the upper and lower clamping bars 42 and 43 but also behind these teeth as clearly shown in FIGS. 11A and 11B. Referring to FIG. 9, the angle bar 47 and toothed body portion 45 are held in an upright or non-splicing preliminary position by pivoted keepers 49 on the hinged angle bar 47 which may engage under fixed detents 50 on the I-beam flange 44. These elements are also shown in FIG. 6. To release the angle bar 47 for downward swinging to the active splicing position shown in FIGS. 16 and 17, the keepers 49 are merely swung from beneath the detents 50 manually. A retractile spring 51 serves to bias the lower clamping bar 43 to the active position wherein the body portion 45 having teeth 46 is level or horizontal. This position can be accurately regulated by an adjustable screw stop 52 on the I-beam 32 which contacts the back of angle bar 47 in FIG. 17.

The upper clamping bar 42 has a toothed body portion or plate 53 much thinner than the body portion 45 and provided along its lower edge with spaced tapered teeth 54 which coact in assembly with the teeth 46 by overlapping the side faces thereof as best shown in FIGS. 10 through 11B. When so overlapped and positioned, each adjacent pair of teeth 54 and the underlying teeth 46 will create a small diamond-shaped opening 55, FIG. 10, through which one yarn end from a new beam and the companion end from the spent beam are held and positioned for splicing, as shown in FIGS. 11A and 11B. The upper and lower clamping bars provide as many of the positioning and clamping openings 55 as there are separate yarn ends on a beam and the number of teeth and openings 55 may be varied somewhat to meet the needs of particular sizes of beams. The coacting teeth 54 and 46 and the openings 55 created thereby serve the dual purpose of gripping the yarn ends to be spliced or welded together and maintaining the required separation and lateral spacing of the yarn ends for feeding to the multiple needles of a tufting machine.

As will be further mentioned, the diamond-shaped openings 55 serve further to produce in conjunction with the heating element, not yet described, a small diamond-shaped splice or weld 56, FIGS. 20 and 21, in each spliced pair of yarn ends. This splice actually reduces the cross sectional size of the yarn at the point of splicing as shown clearly in FIGS. 20 and 21 to facilitate passage of the spliced yarn through the needle eyes of the carpet tufting machine and this is an important feature of the invention.

The thin body portion 53 of upper clamping bar 42 is backed up by a supporting bar 57 and another carrier member or bar 58 rigid therewith. Again as shown in FIGS. 11A and 11B, the lower edge of bar 58 in assembly extends down approximately to the roots of teeth 54 and the bar 57 has its lower edge disposed at the tops of the teeth 46. Thus, the opposing relationship of the elements 47 and 46 will firmly grip the yarn ends 127 and 128 to be spliced over the full thickness of the elements 47 and 58. Additionally, as the gage of the yarn varies in different operations, the elements 47 and 58 will adjust automatically and slightly increase or decrease the overlap of teeth 46 and 54 and increase or decrease the size of diamond-shaped openings 55 so that the yarn will always be accommodated regardless of its gage or thickness. This construction is somewhat critical in producing the splice 56 properly.

Guide lugs 59 are secured rigidly to the ends of member 58 and engage over or straddle an extension 59' of body portion 45 and a short section of the angle bar 47 at the remote end of body portion 45 as shown in FIGS. 5 and 9. Near one end, the bar 47 carries a stop pin 60 against which the adjacent lugs 59 may be abutted to establish the proper spacing or interfitting relationship of the teeth 54 and 46, when the upper clamping bar 42 is applied to the lower bar 43 with the yarn ends between the two bars. Referring to FIG. 5, the left hand end of the upper bar 42 may be brought down first on the bar 43 and when the lugs 59 are engaged with stop pin 60, the other end of the bar 42 is brought down so that its lugs 59 will straddle the extension 59 in FIG. 9. Additionally, the two clamping bars are stabilized in assembled relationship by piloting pins 61 on the upper bar engaging within holders 62, FIG. 18, on the angle bar 47 of lower clamping bar 43. A very secure arrangement is thus provided and yet the two clamping bars may be readily separated.

As shown in FIGS. 1, 2 and 5, the apparatus includes several vertically adjustable horizontal yarn guiding rods 63 whose use or purpose will be described. These elements 63 have their ends supported in upstanding apertured brackets 64 near the ends of the main frame and beyond the ends of the clamping bars 42 and 43, FIG. 1. Each individual rod 63 can be removed endwise from the brackets 64 for adjusting its height by simply swinging to one side a pivoted keeper 65, FIG. 2, which normally prevents such endwise movement.

The aforementioned splicing or welding head 36 includes an upper divided carriage 66, FIGS. 5 and 7, having carriage wheels 67 which engage and follow track ledges 34 throughout the length of the apparatus. The controls and power components of the head 36 are suspended from carriage members 66 below the I-beam 32 in a box-like enclosure 68 whose details of construction are unimportant. Within this enclosure 68 is a drive motor 69 which is the power source for propelling the splicing head horizontally along track ledges 34. Also contained therein are electrical powering transformers 70 or like power means for the splicing or welding heating element or shoe 71 mounted atop the head 36 near the forward side thereof and below the clamping bar structures, FIGS. 6 and 7. Suitable lead wires 72 electrically interconnect the heating element 71 with its powering means 70.

Conventional speed control and heat control elements 73 and 74 and other parts of lesser importance are included on the end control panel 75 of enclosure 68.

The motor 69 drives a speed reducer 76, in turn driving a vertical shaft 77, FIG. 13, carrying a spur gear 78 arranged between lower and upper plates 79 and 80. Another gear 81 between these two plates meshes with the gear 78 and drives a top gear 82 above the top plate 80. The top gear 82 is shiftable into and out of mesh with a long toothed rack bar 83 fixedly mounted on the bottom of plate 33, FIGS. 5 and 6. When the elements 82 and 83 are in mesh, FIG. 12, the splicing head 36 including heating element 71 will propel itself horizontally along the I-beam 32 from an initial position shown in FIG. 1 toward the opposite end of the apparatus for quickly splicing all of the yarn ends held in the position shown in FIG. 17 above the heating element by the coacting clamping and positioning bars 42 and 43. When the gear 82 and rack bar 83 are out of mesh, FIG. 7, the head 36 will not be propelled even though the motor 69 is on and the gear 82 is turning.

Simple manually operable means shown in FIGS. 7 and 12 is provided to shift the gear 82 into and out of mesh with the rack bar 83, without disengaging gears 78 and 81. Such means comprises an extension 84 on top plate 80, such top plate being pivotal with gear 82 around the axis of vertical shaft 77. An over-dead-center toggle link 85 pivotally interconnects extension 84 with an operating lever 86, in turn pivoted at 87 to an element 88 on the enclosure 68. A retractile spring 89 biases this gear shifting toggle linkage beyond the dead center condition of the link 85, as shown, so that when the lever 86 is moved to the position in FIG. 12, the gear 82 and rack bar 83 will be engaged and this engagement will be maintained by the spring 89. When the linkage is shifted by lever 86 to the disengage position of FIG. 7 with the link 85 beyond dead center, the gear 82 will be held out of engagement with the rack bar. Other forms of gear shifting devices may be employed in the invention, if preferred.

A longitudinally shiftable rod 90, FIG. 7, is spring-loaded forwardly by a spring 91 bearing against a fixed stop 92 secured to the element 66. The rod 90 is supported and guided in brackets 93 also on the element 66, as shown. The rod has a forward push button 94 thereon and a pair of collars 95 are secured to the rod 90 between the brackets 93 in straddling relation to a start and stop switch actuator lever 96 for motor 69. The spring 91 bears against one collar 95 to bias the rod 90 forwardly so as to maintain the motor switch in an off condition. To start the head 36 on its travel along the I-beam 32 during a splicing operation, it is merely necessary to push the button 94 to turn on the motor 69 through the switch actuator 96. With the gear 82 shifted into mesh with rack bar 83, the entire splicing head 36 will travel lengthwise of the I-beam 32 and along the length of the two clamping and positioning bars 42 and 43 to automatically and quickly produce the splices 56 in the separate pairs of yarn ends held within the openings 55, as described. At the completion of travel of the head 36, the terminal end 97 of rod 90 will strike a part of frame end 31 and throw the motor switch actuator 96 to off and thus stop the motor 69 and stop the movement of head 36. Gear 82 can then be disengaged and the head retracted to its position shown in FIG. 1. Other arrangements may be employed including having the motor switch reverse the operation of the motor by means of the rod 90 at the downstream end of the apparatus so that the head 36 will automatically return.

The heating element or means 71 is shown particularly in FIGS. 6, 7, 14, 15 and 16 and is made up of plural electrical radiant heating segments 98 which, during movement of the head 36 along the I-beam 32, pass close to the yarn ends which are being held by the clamping bars 42 and 43, as in FIG. 17. The segments 98 which are conventional per se are mounted on an inverted U-shaped channel member 99, FIG. 6, having its rear end pivoted at 100 between the adjacent carriage member 66 of head 36 and an outer supporting plate 101 provided on the member 66 for this purpose. A coil spring 102 somewhat forwardly of the pivot 100, FIG. 14, constantly biases the pivoted heating element assembly 71 upwardly relative to the head 36 and toward the yarn end clamping bars 42 and 43 when they are in the active position in FIG. 17 above the heating element. The electrical connections between the heating element 71 and the electrical powering means 70 are conventional and include the mentioned wires 72.

An arm 103 closely adjacent the interior side of the channel member 99 is pivoted at 104 to the member 99 and carries at its leading end a guide block or shoe 105, in turn pivoted to the arm 103 at 106. The top of this element 105 is flat, and as shown most clearly in FIG. 17 contacts and slides along the bottom face of clamping bar body portion 45 during movement of the splicing head 36 to guide the heating element and to maintain accurately the close proximity of the radiant heating element to the clamping bars but without physical contact. The elevation of the guide shoe 105 may be adjusted accurately by means of a screw stop 107 at the leading end of the heating element assembly and a fixed stop element 108 on the member 66 is adapted to be engaged by a stop extension 109 projecting from the leading end of the pivoted heating element so that the spring-urged heating element will always be limited by the stop 108 and will not spring upwardly completely when the clamping bars 42 and 43 are shifted to the upright position of FIG. 6 at the completion of a splicing cycle. In essence, the radiant heating unit 71 on the splicing head 36 is urged upwardly resiliently and is guided in very close proximity to the held yarn ends to be spliced but the heating element does not physically contact or slide over the clamping bars. It is only the guiding shoe 105 which makes physical contact, as shown in FIG. 17. The yarn ends are spliced at 56 as described by welding or fusion of the synthetic yarn due to the radiated heat and the results are highly satisfactory and consistent.

The above complete substantially the structural description and mode of operation of the yarn splicing apparatus which quickly splices all of the yarn ends on a new full beam with the yarn ends of a spent beam which have been tufted into a carpet. However, this splicing operation is but a final step in a complete method which involves important preparatory steps essential to utilizing the splicing apparatus with full efficiency in connection with a carpet tufting operation so as to minimize the down time of the tufting machine and the labor of splicing yarn ends and the replenishing of the yarn supply from time-to-time, as well as minimizing splice marks in the carpet.

For an understanding of the overall method included in the invention, reference is now made to FIGS. 22 through 25 which are somewhat diagrammatic. In these figures, the previously described movable splicing apparatus is indicated at 110 in FIGS. 22 and 23. In FIG. 22, a carpet tufting machine is shown at 111 diagrammatically and this machine may be capable of tufting carpeting as wide as fifteen feet. To supply the multitude of needles of the tufting machine 111, banks of carpet yarn beams 112 are arranged on opposite sides of the tufting machine and are supported on suitable beam racks 113 having guide tubes 114 for all of the individual yarn ends on the beams 112 so as to direct the yarn ends to the tufting needles. The guide tubes 114 are conventional. Up to thirty-two separate beams 112 are needed to supply the futing needles and the beams on the racks 113 are arranged in a certain manner as shown, including an interior single row of four beams near the bottom of the rack and three superposed rows of four beams each on the outer side of each rack, FIGS. 22 and 23.

With this arrangement of beams, the tufting machine will operate until the yarn on all beams 112 is substantially exhausted and this exhaustion or depletion will occur substantially simultaneously for all beams in the invention method, to be further described.

Figure 24A:
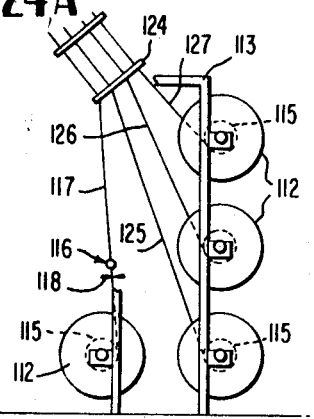
FIGS. 24A through 24E are partly diagrammatic views showing the preliminary method steps which are performed preliminary to splicing the yarn ends of a new full beam with the preceding ends of a spent beam.

FIG. 24A shows the condition when the beams 112 are exhausted as indicated by the reduced diameter at 115. With the tufting machine stopped, the first beam of the single interior row will be processed first, as indicated by the location of the splicing apparatus 110 in FIG. 22. The clamping bar assembly 116 shown in FIG. 4 is now applied to the yarn ends 117 of the particular spent beam close to such beam and the yarn ends are severed below the clamping bar assembly as at 118 so that the exhausted beam 112 may be removed and replaced by a new full beam. Referring to FIG. 4, the clamping bar assembly comprises a cylindrical bar 119 and a coacting seating bar 120 having diverging sides and swiveled clamps 121 on the bar 119 engageable within locking slots 122 of the seating bar so that the two components can be locked together in tight clamping relationship with the yarn ends 117 between them. When this is accomplished, FIG. 24B, a weighted rod 123 is placed upon the yarn ends 117 and the clamp bar 116 is pulled upwardly and engages a yarn guide structure 124 which is fixed.

Figure 24B:
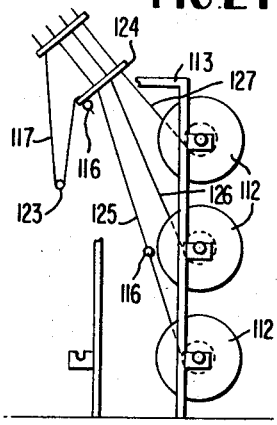
Figure 24C:
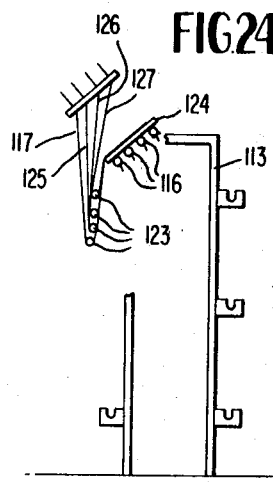

The exact procedure is repeated in connection with each beam 112 in the order or sequence shown in FIGS. 24B and 24C until all of the yarn ends from all thirty-two beams 112 are clamped by the bar assembly 116 and separated from the exhausted beams and such beams are discarded as in FIG. 24C. The clamping bar assembly 116, FIG. 24B, is applied next to the yarn ends 125 of the lower row of beams 112 and following this is applied to the yarn ends 126 of the next uppermost row, and finally to the ends 127 of the top row of beams of the banks of beams on both sides of the tufting machine. After severing the yarn ends close to the clamping bars 116, the weighted rods 123 are applied to all yarn ends as shown in FIG. 24C and the yarn ends of all spent beams are fully conditioned for splicing to the yarn ends of new full beams by means of the apparatus 110. One additional point should be mentioned, namely, that the clamping bar assembly 116 for each set of yarn ends on each beam can be applied at the proper distance from the spent beam to cause the new set of beams to become exhausted substantially simultaneously. For example in FIGS. 24A and 24B, it will be noted that the clamp bars 116 are applied at somewhat different points on the ends 117 and 125. The exact point of application of the clamping bar is a matter of skill and experience but is not difficult to achieve.

Figure 24D:
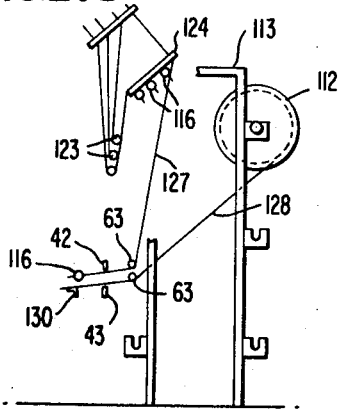
Figure 24E:
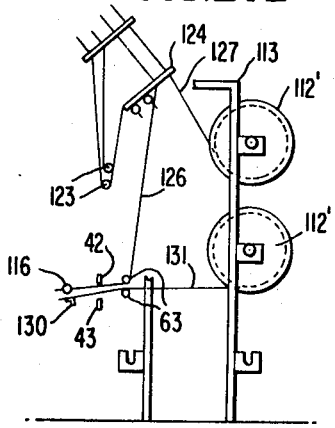
Figure 25:
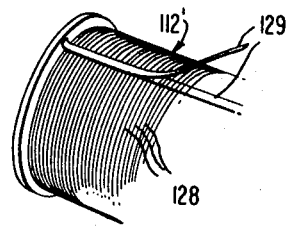
FIG. 25 is a fragmentary perspective view of a full beam of yarn ends.

Referring to FIGS. 24D and 24E, the clamped yarn ends 117 to 127 are processed in the reverse order to that described in connection with FIGS. 24A to 24C. That is to say, the new full beams 112 are first placed in the upper rows on the racks 113 and the yarn ends 128 of each new beam are arranged for splicing by means of the apparatus 110 to the ends 127 of the last-processed exhausted beam 112. FIG. 25 shows a new full beam 112' with its multitude of yarn ends held secure and separate between conventional tape strips 129.

Referring to FIGS. 25 and 24D, after careful removal of the exterior tape 129, the yarn ends 128 are drawn downwardly and engage a selected one of the aforementioned guide rods 63 of the splicing apparatus and are passed between the toothed clamping bars 42 and 43 while the same are upright and separated, as in FIG. 6. Incident to this, the taping bar 130 shown in FIG. 3 is taped to the yarn ends 128 to maintain their proper spacing and to render them manageable as a unit. The taping bar 120 may be stored on the apparatus during non-use periods as indicated in FIG. 1.

The companion yarn ends 127, FIG. 24D, with their clamping bar assembly 116 are drawn downwardly and around another of the guide rods 63 with their terminal end portions likewise arranged between clamping and positioning bars 42 and 43. At this time, the bars 42 and 43 are brought together as in FIGS. 10, 11A and 18 but the bars are still in the upright position with respect to their hinge mounting 48, FIG. 6. With the yarn ends 127 and 128 now tightly clamped and paired in the spaces 55 afforded by the engaging teeth 46 and 54, FIGS. 10 and 11A, the clamping bar assembly 116 and taping bar 130 are removed and are available for re-use in connection with the next sets of yarn ends 126 and 131, FIG. 24E.

When the yarn ends of each new full beam 112' are processed in accordance with the description on FIG. 24D immediately above and after removal of the clamping and taping bars 116 and 130, the toothed bars 42 and 43 are now shifted to their active horizontal positions in FIG. 17 and the operation of the splicing head 36 is initiated as previously described in detail. This sequence is repeated for splicing the yarn ends of each new beam 112' with the companion previously processed ends 117, 125, 126 and 127 in the order indicated by FIG. 24E. That is, next, the ends 126 are arranged as described relative to a new set of yarn ends 131 and are clamped and properly spaced by the toothed bars 42 and 43 and then spliced. Following this, another new set of yarn ends from another new beam 112' will be arranged and spliced with the yarn ends 125 and following this, another new set of yarn ends will be spliced with the yarn ends 117, which were the first yarn ends in FIG. 24A to have been processed for separation from the spent beam 112 but now the last to be processed with the yarn ends of a new beam. The splicing apparatus 110 is simply moved on its casters to each new station of use and the proper yarn guide rods 63 are employed.

By means of the above preparatory method steps shown in FIGS. 22 through 25, the splicing apparatus 110 is employed with its greatest efficiency and utility and it is now apparent that a single invention and an inseparable invention is involved. This single invention includes a complete method of splicing consisting of the preparatory steps in FIGS. 22 to 25 followed by the splicing step utilizing the splicing apparatus and the invention also includes the apparatus itself which is in fact inseparable from the method.

The various features and advantages of the invention will now be apparent to those skilled in the art without the need for further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A method of splicing all of the yarn ends of a full yarn beam of synthetic thermoplastic yarn ends with the yarn ends of a depleted beam comprising the steps of clamping the yarn ends of the depleted beam and severing such ends near the point of clamping, arranging the severed and clamped yarn ends from the depleted beam near the leading ends of a corresponding number of yarn ends from a new full beam and holding said leading ends in relatively fixed relationship, clamping together individual yarn ends of the depleted beam with corresponding yarn ends of the new beam in laterally spaced pairs near the first named point of clamping and near the point of holding and then releasing the first-named clamping and said holding, and then splicing together the individually clamped and spaced pairs of yarn ends from the depleted and new beams by moving a source of radiant heat along the second-named point of clamping and releasing the spliced ends at the second-named point of clamping.

2. A method of splicing a multitude of synthetic thermoplastic yarn ends from a depleted beam to a corresponding number of like yarn ends from a new beam comprising separating the yarn ends of the depleted beam from the depleted beam and holding them in relatively fixed relationship, holding the yarn ends of the new beam in relatively fixed relationship near the held yarn ends from the depleted beam, clamping the held yarn ends from both beams in side-by-side contacting relation and in uniformly spaced pairs and releasing the previous holding of the yarn ends, and then splicing all parts of clamped yarn ends by the application of heat in close proximity thereto to produce fusion of the ends in each pair.

3. The method of claim 2, wherein said heat is radiant heat applied from a moving radiant heat source and causing said heat source to travel along a path adjacent to all of the clamped pairs of yarn ends.

4. A method of splicing multiple thermoplastic yarn ends quickly and in a highly uniform manner comprising the steps of clamping together multiple spaced pairs of yarn ends to be spliced and maintaining the clamped together pairs in a fixed position, and moving a radiant heating means in a path which traverses all of the clamped pairs of yarn ends close to the pairs and thereby causing each pair to be thermally fused with a strong bond.

References Cited

UNITED STATES PATENTS

| 3,055,786 | 9/1964 | Hendrix | 156—158 |
| 3,323,971 | 6/1967 | Williams | 156—433 |
| 2,863,491 | 12/1958 | Chang et al. | 156—433 X |
| 3,040,153 | 6/1962 | Seney | 156—433 X |
| 2,514,184 | 7/1950 | Lower | 156—433 X |

PHILIP DIER, Primary Examiner

U.S. Cl. X.R.

156—159, 380, 433, 441, 502